United States Patent [19]

Jensen

[11] 4,116,065

[45] Sep. 26, 1978

[54] TRANSPARENT THERMOMETER

[75] Inventor: William Kenneth Jensen, Royal Oak, Mich.

[73] Assignee: O.E.M. Technical Sales, Inc., Southfield, Mich.

[21] Appl. No.: 828,705

[22] Filed: Aug. 29, 1977

[51] Int. Cl.² .............................................. G01K 1/14
[52] U.S. Cl. ................................................... 73/378
[58] Field of Search ................. 73/371, 374, 376, 377, 73/378

[56] References Cited

U.S. PATENT DOCUMENTS

| | | | |
|---|---|---|---|
| 1,136,527 | 4/1915 | Hermann | 73/376 |
| 1,322,925 | 11/1919 | Milker | 73/378 |
| 1,345,795 | 7/1920 | Milker | 73/378 |
| 1,605,466 | 11/1926 | Roedell | 73/378 |
| 1,827,778 | 10/1931 | Bolton | 73/376 |
| 2,297,792 | 10/1942 | Neuwirth | 73/378 |
| 2,841,010 | 7/1958 | Garrett | 73/376 |

Primary Examiner—Daniel M. Vasich
Attorney, Agent, or Firm—Reising, Ethington, Barnard, Perry & Brooks

[57] ABSTRACT

The device relates to a thermometer in which the thermometer body and mounting brackets are transparent and in which the thermometer body is adapted to be mounted in spaced relationship on a planar surface such that viewing may occur through the thermometer with minimal visual interference.

3 Claims, 4 Drawing Figures

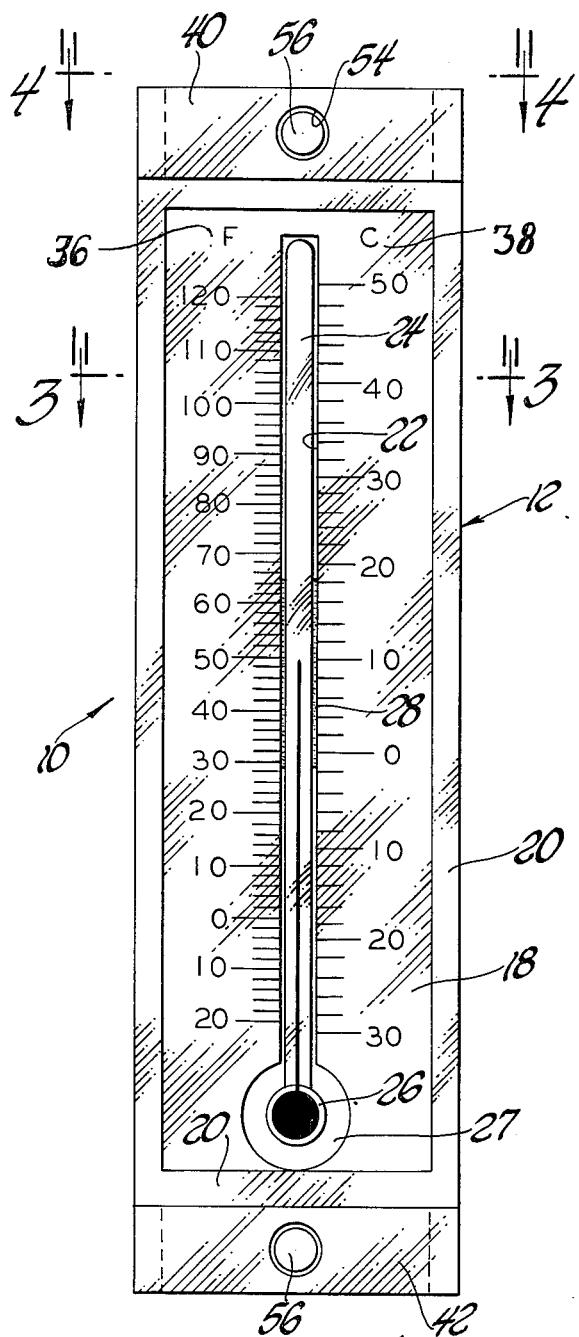
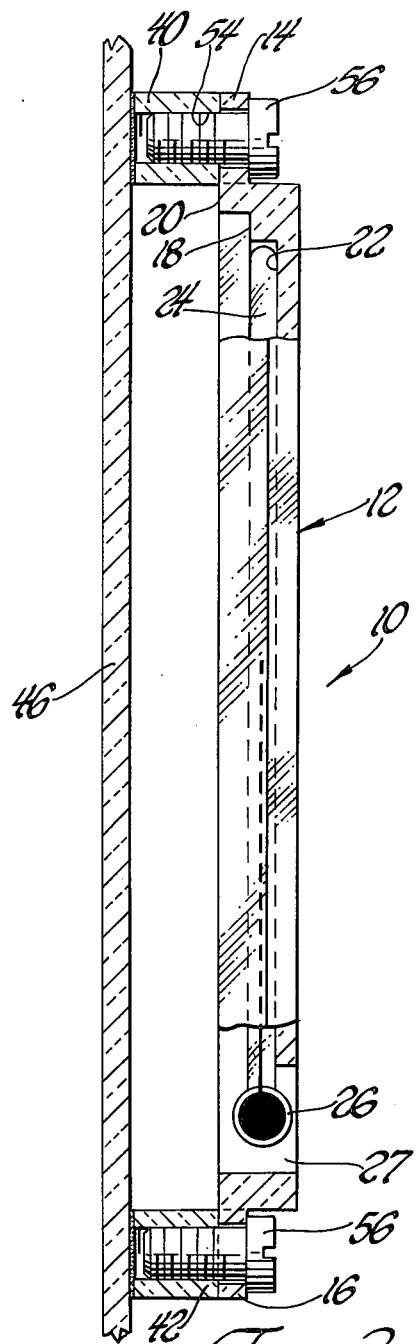
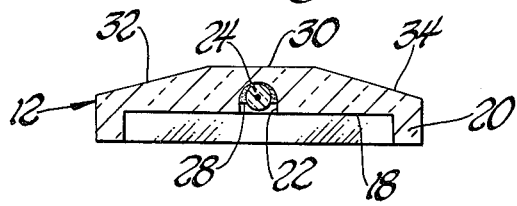
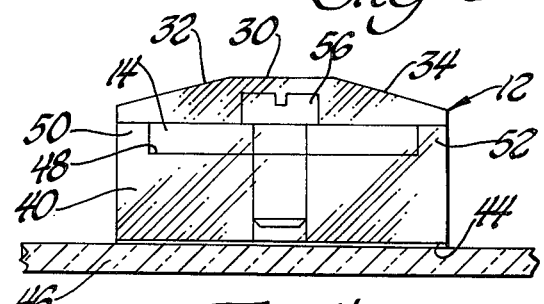

TRANSPARENT THERMOMETER

The present invention relates to a thermometer particularly adapted to be mounted upon a window to register outside ambient temperature when being observed from inside of a vehicle or other structure in such a way as to result in minimum obstruction of outside viewing. To this end, it is an object of the present invention to construct the thermometer and its mounting structure as to be predominantly transparent. More specifically, the present invention is formed in such a way that essentially only the thermometer liquid, e.g. mercury, and the thermometer scales are opaque while the remainder of the thermometer structure is transparent.

It is a further object of the present invention to utilize a transparent thermometer mounting structure such that the thermometer, per se, is removable or replaceable and further which mounting structure may be positioned at any convenient location on the window.

Inasmuch as it is desirable to achieve as accurate an outside temperature reading as is possible consistent with mounting such thermometer on a window, the thermometer and thermometer structure are so related as to space the thermometer element away from the window so as to permit substantially free circulation of the ambient air around the temperature responsive thermometer liquid.

While particularly useful as an outside mounted mirror, the subject device includes unique mounting brackets which may be reversed in such a way that the mirror may be mounted on an inside wall where the transparent or see-through feature is desirable.

PRIOR ART

Thermometers having transparent sections for viewing from inside to outside are known and are illustrated in U.S. Pat. Nos. 3,196,684 Vernon Sr. and 3,898,884 Hopkins et al. However, such prior art devices have been constructed in such a way as to include substantial portions thereof which are not transparent and further which devices are limited as to where on a window they may be mounted. Furthermore, such prior art devices, while generally recognizing the necessity for permitting the circulation of ambient air around the temperature responsive thermometer element, by virtue of their construction, have created shielded pockets or chambers which would be subjected to convected heat from an inside room or space so as to modify the ambient outside temperature reading.

PRESENT INVENTION

In the present invention, both the thermometer casing as well as the casing mounting structure are transparent and the only opaque part of the thermometer construction is the liquid thermometer material and the adjacent graduated scales and numerals. Thus, for all intents and purposes, the only part of the subject thermometer device that is visible to the viewer is the thermometer liquid and the scales against which the thermometer liquid level is read. In this way, the subject thermometer is constructed in such a manner that there is minimum awareness of or interference with outside viewing by an individual looking outwardly through a window from an internal compartment or room.

While the subject invention may be utilized on the window of a building or home, it is particularly useful in the application to a vehicle, and more specifically to a recreational vehicle, where minimum obstruction to or interference with an outside view is most important. Thus, while an occupant frequently wishes to know the temperature outside of a vehicle, he also wishes to have a minimum awareness of the presence of a thermometer so as to minimize the obstruction to an outside view. It is particularly necessary with a recreational type vehicle such as a trailer or motor home when such is parked for extended periods that the thermometer also read the outside temperature as accurately as possible and not be affected by the temperature within the vehicle through convection. To this end, the subject transparent thermometer device is supported upon a window in such a manner that the entire temperature responsive thermometer liquid is exposed to the ambient atmosphere which may freely circulate around the temperature responsive liquid even where the vehicle is not in motion.

To minimize optical distortion in looking through the thermometer of the subject invention, the cross section of the thermometer structure is made as thin as possible and essentially utilizes all planar surfaces which are as close as possible to being either parallel or perpendicular to the window surface on which the thermometer is being mounted. Thus, by avoiding rounded or curved sections and maintaining the thermometer cross section as thin as possible, optical distortion is minimized as an occupant views outwardly through such thermometer device.

More specifically, the subject invention includes a thin cross section transparent plastic member having a vertically extending recess therein adapted to receive an encapsulated tube containing the temperature responsive thermometer liquid. One or more graduated scales are printed or otherwise formed on the transparent sheet and adjacent the thermometer tube recess to provide ready reading of the outside temperature. To mount the transparent thermometer tube supporting structure upon a window, a pair of transparent brackets are provided and which brackets are adhered to the window through a suitable transparent cement or adhesive material. The transparent thermometer tube supporting member includes end sections which extend vertically beyond the encapsulated thermometer tube and which extensions or tabs are adapted to be directly mounted to the brackets. Thus, the brackets support the encapsulatd thermometer tube in spaced relationship from the supporting window such that ambient outside air may circulate around such tube throughout its entire length.

If the thermometer tube supporting structure is to be permanently mounted upon the window structure, then the longitudinal extensions or tabs formed thereon may also be cemented or adhered to the supporting brackets. On the other hand, should it be desired to make the thermometer tube supporting structure removable or replaceable in the event of damage thereto, the supporting tabs may be provided with suitable openings through which screw members may be mounted for threadable attachment to the mounting brackets. In such case, the screw members may either be of metal construction or can also be made of the same plastic material as the thermometer to further enhance the transparent character of the thermometer.

In the drawings:

FIG. 1 is a front elevational view of the thermometer as viewed through a window from inside a compartment;

FIG. 2 is a side elevational view of the thermometer as mounted upon a window;

FIG. 3 is a sectional view along line 3—3 of FIG. 1; and

FIG. 4 is a plan view along line 4—4 of FIG. 1.

Referring to FIG. 1, the thermometer is indicated generally at 10 and includes a transparent elongated body 12 molded from any suitable plastic material such as Lexan or Lucite. As best seen in FIGS. 1 and 2, body 12 is of an elongated, rectangular construction having a relatively thin cross section and terminating at its upper and lower ends in tabs or extensions 14 and 16.

Body 12 includes a planar or flat front face 18 surrounded by an offset rectangular ridge 20. An elongated channel or groove 22 is recessed from front face 18 and adapted to receive an encapsulated tube 24 having an enlarged lower end 26 providing a reservoir for temperature responsive liquid such as mercury. The depth of channel 22 is such as to accommodate thermometer tube 24 therewithin without projecting beyond planar face 18 of body 12 in order to protect the tube from being damaged. The lower end of tube groove 22 terminates in an enlarged opening 27 which is transverse or normal to front face 18 and extends completely through body 12. Liquid reservoir 26 is disposed within opening 27 through which ambient air moves freely.

The encapsulated thermometer tube 24 is suitably retained within body channel 20 through a suitable transparent adhesive or cement 28 generally midway of the tube ends. The back wall or face of thermometer body 12 includes a flat or planar surface portion 30 parallel to front face 18 and flanked by two forwardly inclined planar surfaces 32 and 34. The planar sections 32 and 34 are inclined at an angle of approximately 15° from the flat or planar central section 30. By thus beveling the back face of body 12, the mass of body 12 is reduced while at the same time not introducing any meaningful optical distortion to the body as one views therethrough.

The front or planar face 18 of support body 12 includes either or both a Fahrenheit and/or Centrigrade scales 36 and 38 suitably printed or otherwise formed thereon so as to be immediately adjacent encapsulated tube 24. It has been found to be most satisfactory to hot-stamp scales 36 and 38 on face 18 of body 12 by utilizing an opaque, white plastic material. Such a white, opaque scale enables easy reading of the mercury level in encapsulated tube 24. Opaque white looks black while viewing during daylight hours and reflects internal light so that it can be read at night.

Reference is now made to FIGS. 2 and 4 of the drawings wherein the thermometer body window mounting arrangement is depicted and including brackets 40 and 42. Since brackets 40 and 42 are of identical construction, only one such will be described in detail. At the outset it is to be noted that brackets 40 and 42 are formed of a transparent material as is body 12. To minimize optical distortion, it is preferred that the brackets 40 and 42 be made of the same transparent material as is body 12. Bracket 40 includes an elongated, planar face 44 which is adapted to be mounted against window 46 through a suitable transparent adhesive or cement. The opposite face 48 of bracket 40 is transversely recessed so as to provide a pair of projecting leg portions 50 and 52 at the laterally outer edges thereof and adapted to receive thermometer body tab 14 therebetween.

In the modification shown, a central threaded hole 54 is formed through bracket 40 to receive a suitable screw member 56 in the event it is desired to make thermometer body 12 removable or replaceable. Tabs 14 and 16 of thermometer body 12 are thus adapted to be recessed within and supported by brackets 40 and 42. Screw members 56 project through the openings in body tabs 14 and 16 so as to threadably engage with the threaded holes 54 in brackets 40 and 42. To maximize the overall transparent character of the thermometer, it is preferred that screws 56 also be formed of the transparent material from which body 12 and brackets 40 and 42 are formed. Should screws 56 not be transparent, at least a portion of the means, e.g. body tabs 14 and 16, for securing body 12 to brackets 40 and 42 is transparent.

It is important to the proper functioning of a window mounted thermometer for reading outside temperature that the temperature responsive element be fully exposed to outside ambient air and not be affected by heat transmitted as by convection through the window. Circulating outside ambient air about the temperature responsive element is not normally a problem where the air is in motion as with a moving vehicle. However, where a vehicle, such as a house trailer or motor home, is at rest, it is common to trap air between the window and the temperature responsive element thereby causing an inaccurate outside temperature reading. As best seen in FIG. 2, brackets 40 and 42 transversely space body 12 from window 46 so that the entire length of temperature responsive element 24–26 is exposed to outside ambient air which cannot be trapped between the element and the window. In addition, transverse body hole 27 further assures movement of outside ambient air over reservoir 26.

In that case where it is desired to mount the thermometer on an inside wall with minimum awareness of its presence, brackets 40 and 42 may be reversed with respect to body tabs 14 and 16. In other words, by positioning brackets 40 and 42 against the opposite faces of tabs 14 and 16, or disposed 180° from the positions shown in FIG. 2, the thermometer could be mounted in spaced relation against an inside wall. In this manner the wall coloring or decoration would be visible through the transparent body 12 and brackets 40 and 42.

It is apparent that various modifications may be made in the subject invention within the scope of the hereinafter appended claims.

The embodiments of the present invention in which an exclusive property or privilege is claimed are defined as follows:

1. A thermometer device of the type adapted to be mounted on the outside of a window for viewing from within a compartment, said device comprising an elongated, transparent body having a planar front face adapted to be disposed adjacent said window and a rear face spaced from said front face, a pair of integral tab members projecting beyond the upper and lower ends of said body, a recess formed in the front face of said body and axially aligned between said tabs, an elongated, encapsulated tube containing a temperature responsive liquid therewithin, said tube being mounted within said recess so as to be disposed between the front and rear faces of said transparent body, said encapsulated tube including an enlarged, temperature responsive, liquid containing reservoir at its lower end, said body recess terminating at its lower end in an opening extending between the front and rear body faces and within which opening said reservoir is disposed, a temperature indicating scale disposed on said body proximate said recess, a pair of transparent brackets each including a first face adhered to said window and a second face transversely spaced from said first bracket face and means for securing said tabs to the second faces of said brackets whereby the entire transparent body is transversely spaced from said window.

2. A thermometer device of the type adapted to be mounted on the outside of a window for viewing from within a compartment, said device comprising an elongated, transparent body having a planar front face adapted to be disposed adjacent a window and a rear face transversely spaced from said front face, a pair of integral tab members projecting beyond the upper and lower ends of said body, a recess formed in the front face of said body and longitudinally aligned between said tabs, an elongated, encapsulated tube containing a temperature responsive liquid therewithin, said tube being mounted within said recess so as to be disposed between the front and rear faces of said transparent body, a temperature indicating scale disposed on said body proximate said recess, a pair of transparent brackets each including a first face adapted to be adhered to a window and a second face transversely spaced from said first bracket face, the second face of each bracket including a recess adapted to receive one of said body tabs, and means for securing said tabs within the recesses of said brackets to transversely space the transparent body from a window, at least a portion of the means for securing said body to said brackets being transparent.

3. A thermometer device as set forth in claim 2 wherein the rear face of said transparent body includes a planar central section parallel to said front face and a pair of planar sections disposed adjacent said central section and inclined toward said front face.

* * * * *